Sept. 24, 1935. H. WACH Re. 19,715

COMBINED RECIPROCATING ENGINE AND TURBINE

Original Filed April 6, 1926 2 Sheets-Sheet 1

INVENTOR
Hans Wach
BY
Dean Fairbanks Hirsch & Foster
ATTORNEYS

COMBINED RECIPROCATING ENGINE AND TURBINE

Original Filed April 6, 1926 2 Sheets-Sheet 2

INVENTOR
*Hans Wach*
BY
Dean Fairbank Hirsch & Fairbank
ATTORNEYS

G-71

Reissued Sept. 24, 1935

Re. 19,715

UNITED STATES PATENT OFFICE 19,715

COMBINED RECIPROCATING ENGINE AND TURBINE

Hans Wach, Kilchberg-Zurich, Switzerland

Original No. 1,764,061, dated June 17, 1930, Serial No. 100,070, April 6, 1926. Application for reissue February 23, 1933, Serial No. 658,047. In Germany February 12, 1926

16 Claims. (Cl. 60—21)

My invention relates to combined reciprocating engines and exhaust steam turbines of the type in which speed reducing gearing and an oscillation absorbing coupling is employed between the turbine and the main shaft, and involves certain novel improvements whereby the operation of the turbine may be controlled by the control mechanism of the reciprocating engine.

As one feature, the coupling is automatically cut out on reversing the engine.

As another feature, lost motion connections to the control mechanism are provided whereby the turbine is stopped upon stopping or reversing the engine, and may be started at will by the use of exhaust steam only when the control mechanism of the reciprocating engine is in ahead position.

Figure 1:
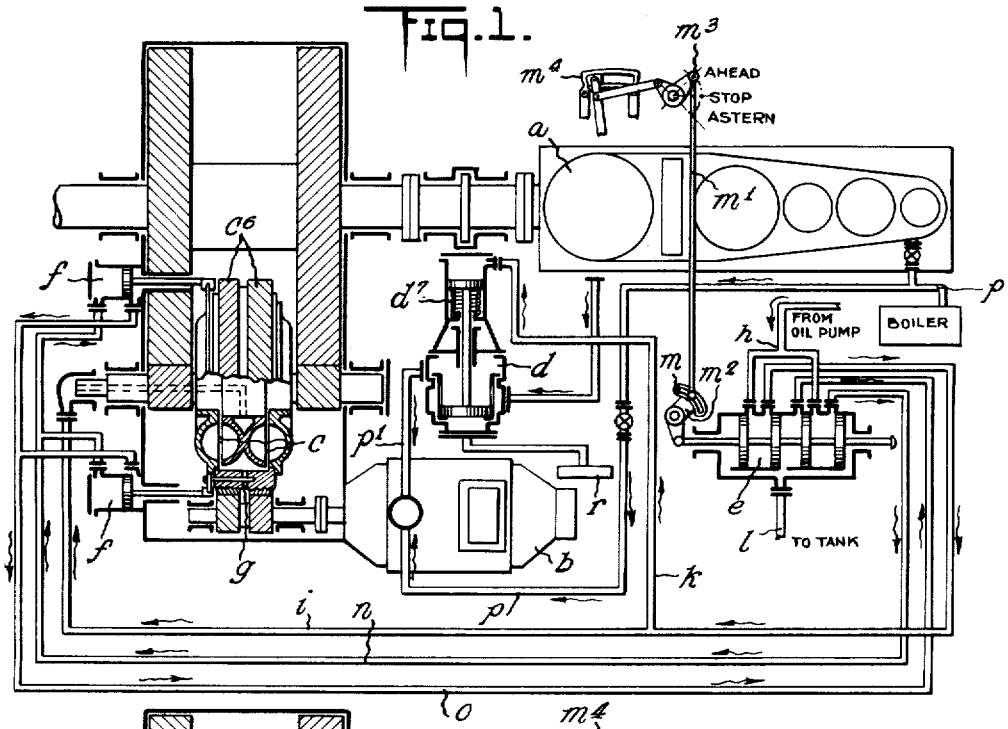
Figure 2:
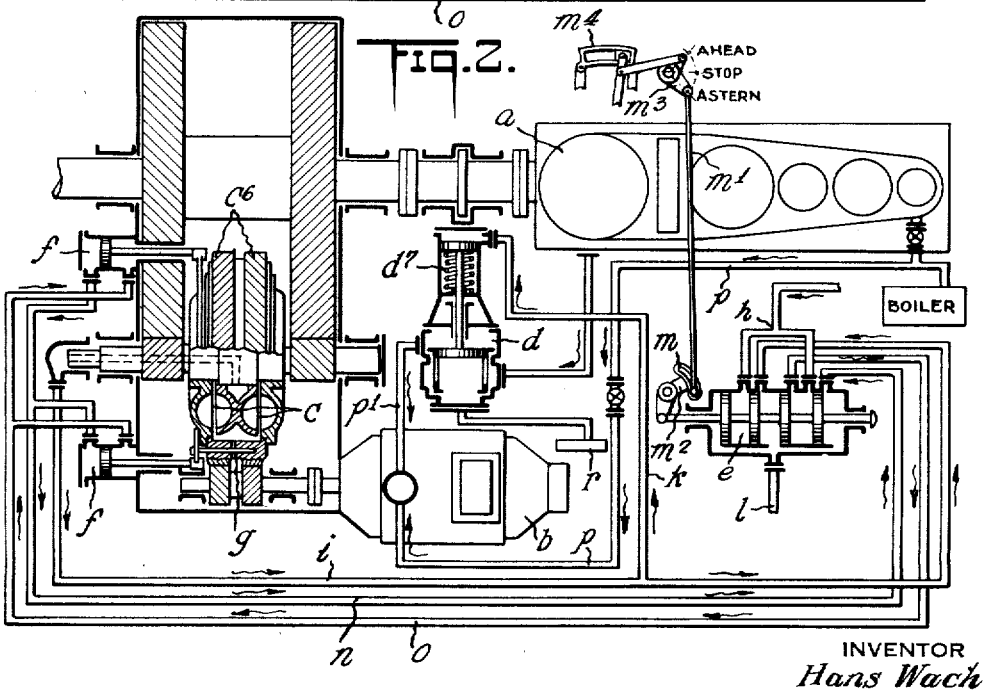

The invention is illustrated diagrammatically, in the accompanying drawings, in which Fig. 1 shows the parts in position for forward movement, while Fig. 2 shows the parts in position when reversing. Figs. 3, 3a, 4 and 5 are sectional views on an enlarged scale showing detail parts of the combination, Fig. 3 being a section through the fluid coupling, Fig. 3a being a side view thereof, Fig. 4 showing the steam control valve and Fig. 5 the oil distributing valve.

In the drawings, *a* represents the reciprocating steam engine, *b* the exhaust steam turbine, *c* the fluid coupling built into the transmission, *d* the steam distributing valve which allows the exhaust steam from the engine *a* to pass either to the turbine or to a condenser which is diagrammatically shown at *r*; *e* is the oil distributor valve operated by the reversing mechanism of the reciprocating engine through the member *m*, *f* the control pistons for the supply and withdrawal of liquid respectively to and from the coupling *c*, *g* the outlet passage of the fluid coupling, *h* the oil inlet pipe connected to an oil pump, not shown, and to the oil distributor valve *e*, *i* a pipe conducting oil under pressure from the valve *e* to coupling *c*; *k* a branch pipe conveying oil under pressure to the steam distributing valve *d*; *l* a pipe conducting oil to a tank, not shown; *n* and *o* are pressure oil conduits leading from the oil distributing valve *e* to the control pistons *f*; *p* a pipe for live steam supplied by a boiler (not shown); *p'* a pipe for exhaust steam from the reciprocating engine to the turbine. The parts are in the position shown in Figs. 1 and 5, i. e., for the forward drive, the operation is as follows:

When the reciprocating engine *a* is running ahead the oil distributing valve *e* will be placed in the position indicated in Fig. 1. The member *m* allows this movement to be effected by the reversing mechanism. In this position of the oil distributing valve *e*, the pistons *f* due to the supply of oil thereto under pressure through the pipe *n* and the withdrawal of oil therefrom through the pipe *o*, are so operated that the outlet *g* of the fluid coupling *c* is closed. Moreover, oil under pressure is supplied through the pipe *i* to the fluid coupling. When the latter becomes filled, there is a certain pressure of oil in the pipes *i* and *k* acting on the spring loaded steam valve *d* so that exhaust steam from the reciprocating engine can flow to the turbine, which through the fluid coupling and the transmission gear will operate the driving shaft of the reciprocating engine.

If the reciprocating engine is to be reversed, the parts are moved to the position shown in Fig. 2 in the following manner:

The oil distributing valve *e* by link *m* of the reversing mechanism of the reciprocating engine is moved to the position shown in Fig. 2 whereby the pipe *i* and therefore the pipe *k* are shut off from the oil supply and are connected with the oil discharge pipe *l*. Because of the consequent lowering of the oil pressure in the pipes *i* and *k*, the valve *d* is automatically spring actuated to a position to cut off the flow of steam to the turbine and to direct the steam into a condenser *r*. At the same time, oil under pressure is directed through the pipe *o* to the inner ends of the cylinders in which the pistons *f* are disposed and oil is allowed to escape from the outer ends of said cylinders through the pipe *n*. Thus, the pistons *f* are caused to actuate the valve which controls the oil passage *g* to open said passage, and oil is allowed to drain from the fluid coupling, the turbine thereupon becoming uncoupled from the reciprocating engine.

Figure 5:
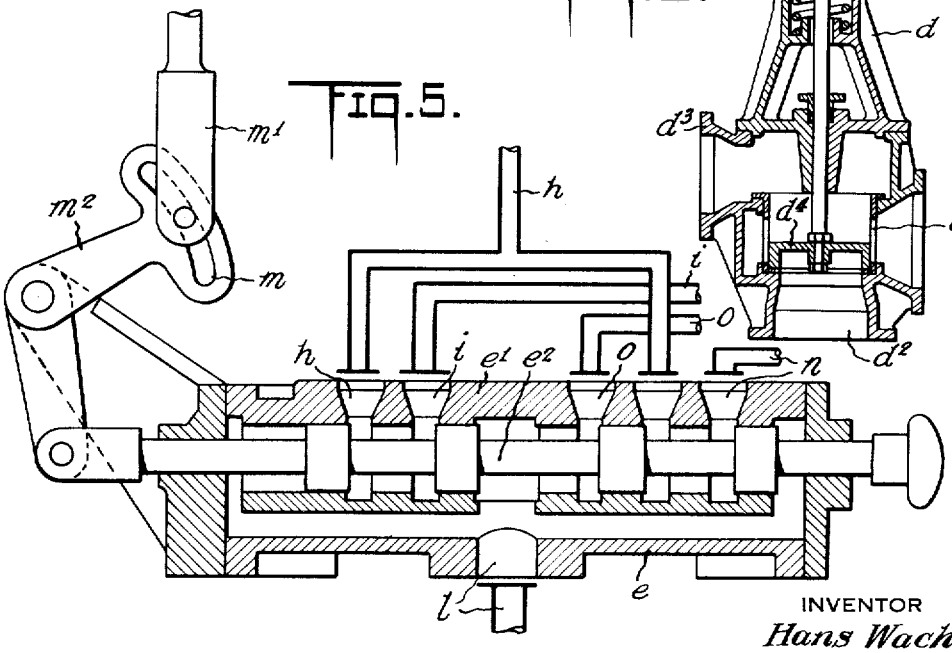

The plunger $e^2$ is shown as connected to the reversing lever of the reciprocating engine by a rod *m'* and a bell crank lever $m^2$. This bell crank lever has an arcuate slot *m* which receives a pin at the end of the rod *m'*. This rod is connected to a reversing lever $m^3$ diagrammatically illustrated as connected to the engine reversing valve mechanism $m^4$. When the reversing lever of the reciprocating engine is in the ahead position as shown in Fig. 1, the pin on the rod *m'* will be intermediate of the ends of the slot *m* as shown in Figs. 1 and 5. When the reciprocating engine is reversed, the reversing lever is moved from the ahead position as shown in Fig. 1 to the astern position as shown in Fig. 2, and during this movement the end of the rod *m'* will first move to the lower end of the slot *m* and will, during its continued movement, engage the lower end of the slot and swing the bell crank lever in a clockwise direction to move the plunger $e^2$ from the position shown in Figs. 1 and 5 to the position shown in Fig. 2. It will thus be seen that the reversing of the reciprocating engine automatically empties the coupling and shuts off the exhaust steam to the turbine. This permits the reciprocating engine to be quickly reversed without having to overcome the momentum of the rotating turbine and directly connected parts. With the parts in the position shown in Fig. 2 and the engine operating in reverse, it is not possible to move the plunger $e^2$ by hand back to the position shown in Figs. 1 and 5, the turbine cannot be driven by exhaust steam, and the coupling cannot be filled. Upon returning the reciprocating engine reversing lever to the ahead position, the valve $e$ is thereby unlocked and may be moved back to the position shown in Figs. 1 and 5 and the turbine may be started and the coupling filled. With the parts in the position shown in Figs. 1 and 5 it is possible to move the valve $e$ by hand back to the position shown in Fig. 2 and thereby conduct the exhaust steam directly to the condenser and uncouple the turbine. This is because in moving the reversing lever to the ahead position, the pin on the rod $m'$ does not engage the upper end of the slot $m$ and leaves the lever $m^2$ free to be moved in a clockwise direction.

Figure 3A:
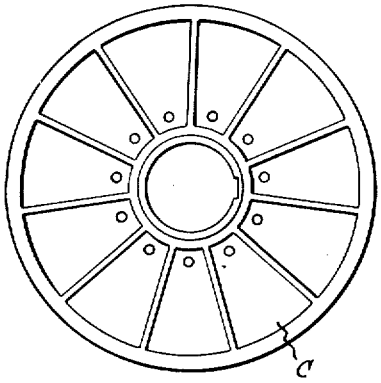
Figure 3:
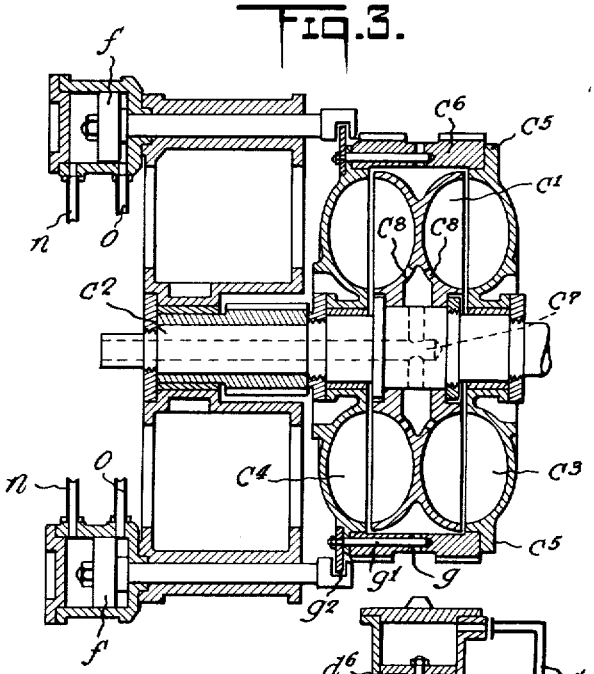
Figure 4:
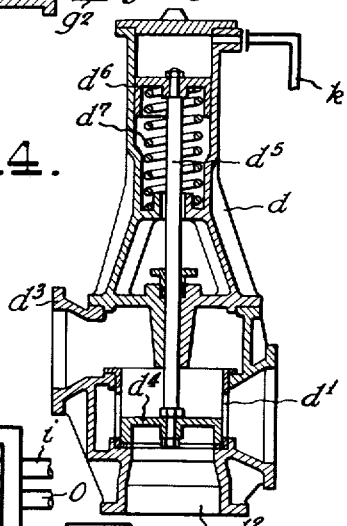

In Figs. 3 and $3^a$ is shown on a larger scale the fluid coupling $c$. The center part $c^1$ is keyed to the drive shaft $c^2$. The center part $c^1$ is surrounded by the outer coupling members $c^3$, $c^4$ which are loosely mounted on shaft $c^2$. Between the outer coupling members $c^3$ and $c^4$, there is provided a toothed annulus $c^6$ to be driven from the shaft of the turbine. For the admission of the coupling fluid (oil) there is provided in the shaft $c^2$ a bore $c^7$, the fluid entering through said bore and through apertures $c^8$ into the hollow spaces formed by the central part $c^1$, the outer coupling members $c^3$, $c^4$ and the projecting ribs $c^5$ provided on the parts $c^1$, $c^3$, $c^4$ of the coupling.

In the toothed annulus $c^6$ are provided a number of apertures $g$, controlled by plungers $g^1$, which are engaged by a ring $g^2$, which in turn is engaged by the pistons $f$, so that as the latter are moved in one or the other direction, the plungers $g^1$ are moved forward or are withdrawn, thereby either closing or opening the apertures $g$. In the latter case, the fluid can escape from the hollow spaces of the coupling.

In Fig. 4 is shown on an enlarged scale the steam control valve $d$. The exhaust steam of the reciprocating engine enters the valve at $d^1$, which is connected to the condenser with its portion $d^2$ and to the steam conduit leading to the turbine, with its portion $d^3$. $d^4$ is the slide-valve which by means of a stem $d^5$ is connected with the guide-piston $d^6$. The space above this piston is connected with the oil conduit K, whereas on the underside of the piston $d^6$ acts a helical spring $d^7$.

Fig. 5 is an enlarged sectional view of the oil-distributing valve $e$. In the casing $e^1$ is contained the plunger $e^2$ which by means of the slotted member $m^2$ is controlled by the reversing mechanism which includes a rod $m'$ of the reciprocating engine. The plunger $e^2$ is shown in the position, corresponding to the forward drive of the engine. At $h$, $i$, $l$, $n$ and $o$ are shown the connections for the corresponding pipes shown in Figs. 1 and 2.

Live steam can flow through pipe $p$ to the turbine when, in the event of any breakdown of the reciprocating engine the latter is disconnected from its shaft which is then driven solely by the turbine.

The coupling $c$ as illustrated in the drawings, is preferably arranged upon the intermediate shaft of the transmission so that on the turbine being cut out only the toothed wheels mounted on the main shaft and the first gear wheel will rotate.

According to this invention therefore steam can pass from the reciprocating engine to the turbine only, when the turbine is connected through the coupling with the shaft of the reciprocating engine. A new technical effect is produced in that by the interconnection of the control mechanism for the reciprocating engine, the turbine cannot be driven by exhaust steam for ahead operations when the reciprocating engine is stopped or in reverse, and may or may not be operated, as desired, when the control mechanism is in position for ahead operation of the reciprocating engine.

A further advantage of the invention is the following:—

It is known that turbines run very quickly which is undesirable for reversing because a great strain is placed thereby on the turbine elements and the toothed gearing.

For ships, however, the quick reversal of the engines is of greatest importance for reason of safety. It is also of great importance because the propeller often rises out of the water during bad weather and so endangers a turbine running at a very high speed, or in case of damage to the engine or coupling permitting the turbine to be stopped without the running of the reciprocating engine being affected thereby.

In all these cases because of the positive interconnection between the control mechanism and the steam control valve, no exhaust steam can pass to the turbine from the reciprocating engine to drive the latter ahead when the steam engine is stopped or in reverse. It is advantageous to interconnect the control of the fluid coupling with the control mechanism of the reciprocating engine so that the fluid coupling is permitted to empty when the reciprocating engine is stopped or in reverse, but connections are provided whereby live steam may be delivered to the turbine and the latter used to drive the ship when the steam is shut off from the reciprocating engine, and the reciprocating engine is disconnected from the propeller shaft.

I wish it to be understood that I do not limit myself to the exact details of construction shown and described, as my invention is obviously capable of various modifications.

I claim as my invention:—

1. In combination a reversible reciprocating steam engine, a drive shaft operatively connected thereto, a steam turbine, means including a speed reducing gearing and a fluid coupling having an inlet and an outlet, connecting said turbine and said drive shaft, a member for controlling said engine and having forward and reverse positions, and means controlled by said member for effecting emptying of said coupling on movement of said member to engine reversing position.

2. In combination a reversible reciprocating steam engine, a drive shaft operatively connected thereto, a steam turbine, a valve controlling the steam supply to said turbine, means including a speed reducing gearing and a fluid coupling having an inlet and an outlet, connecting said turbine and said drive shaft, a member for controlling said engine and having forward and reverse positions, and means controlled by said member for effecting emptying of said coupling on movement of said member to engine reversing position and for operating said valve to shut off steam supply to said turbine.

3. In combination a reversible reciprocating steam engine, a drive shaft operatively connected thereto, a steam turbine, means including a speed reducing gearing and a fluid coupling having an inlet and an outlet, connecting said turbine and said drive shaft, a member for controlling said engine and having forward and reverse positions, and means controlled by said member for controlling the escape of liquid from the outlet of said coupling.

4. In combination, a reciprocating steam engine, a drive shaft operatively connected thereto, a steam turbine, means comprising a fluid coupling adapted to be supplied with fluid to operatively connect said steam turbine with said drive shaft and adapted to have fluid exhausted therefrom to disconnect said turbine from said drive shaft, a conduit connecting said reciprocating steam engine with said turbine for directing exhaust steam from the former to the latter, a valve controlling the supply of exhaust steam from said engine to said turbine, and a single means simultaneously controlling both the operation of said valve and the flow of fluid to and from said fluid coupling.

5. In combination, a reciprocating steam engine, a drive shaft operatively connected thereto, a steam turbine, means comprising a fluid coupling adapted to be supplied with fluid to operatively connect said steam turbine with said drive shaft, and adapted to have fluid exhausted therefrom to disconnect said turbine from said drive shaft, a conduit connecting said reciprocating steam engine with said turbine for directing exhaust steam from the former to the latter, a fluid operated valve adapted to permit flow of a supply of exhaust steam from said engine to said turbine, and a valve mechanism for supplying fluid under pressure to said coupling to couple said turbine to said drive shaft and fluid under pressure to said valve for opening the same to permit steam to flow to said turbine.

6. In combination, a reciprocating steam engine, a drive shaft operatively connected thereto, a steam turbine, a fluid coupling comprising two members, one member being operatively connected to said turbine shaft and the other being operatively connected to said drive shaft, whereby fluid supplied between said members serves to couple them together and whereby exhaust of fluid from between said members serves to disconnect them from one another, a conduit connecting said reciprocating steam engine with said turbine for directing exhaust steam from the former to the latter, a valve controlling the supply of steam to said turbine, and a single means for simultaneously controlling both the supply and exhaust of fluid to and from said coupling and the operation of said valve.

7. In combination, a reversible reciprocating steam engine, a drive shaft operatively connected thereto, a member for controlling the direction of rotation of said engine and having forward and reverse positions, a steam turbine, means including a fluid coupling operatively connecting said turbine to said shaft, a fluid actuated valve controlling the supply of steam to said turbine, a fluid actuated member for controlling the escape of liquid from said coupling, a fluid circuit communicating with said last mentioned member and said valve, and means responsive to the actuation of said first mentioned member for supplying fluid under pressure to said circuit to operate both said coupling and said valve upon actuation of said control member from forward to reverse position.

8. In combination, a reciprocating steam engine, control mechanism for said steam engine to effect stopping or forward or reverse operation, a drive shaft operatively connected to said engine, a steam turbine, means operatively connecting said turbine and said shaft, and including reduction gearing and a coupling permitting torsional oscillation of the shaft in respect to the turbine, a conduit for supplying exhaust steam from said reciprocating engine to said turbine, valve means for controlling the flow of steam through said conduit to said turbine, and means responsive to the operation of said control mechanism for operating said valve means to shut off the supply of exhaust steam to the turbine when the reciprocating engine is reversed, said valve means having lost motion connections to said last mentioned means for permitting manual operation of said valve means to supply said exhaust steam to said turbine only when said reciprocating engine is in forward operation.

9. In combination, a reciprocating steam engine, control mechanism for said steam engine, a drive shaft operatively connected thereto, a steam turbine means comprising a fluid coupling operatively connecting said turbine to said drive shaft, a conduit for supplying steam to said turbine, valve means for controlling flow of steam through said conduit, and means responsive to operation of said control mechanism controlling both operation of said valve means and said fluid coupling.

10. In combination, a reciprocating steam engine, a member for controlling the direction of rotation of said engine and having forward and reverse positions, a drive shaft operatively connected to said steam engine, a steam turbine, means comprising a fluid coupling operatively connecting said steam turbine to said drive shaft, a conduit for conducting steam to said steam turbine, a condenser, a conduit for by-passing said steam to said condenser, fluid-controlled valve means for directing the steam to either conduit, a fluid circuit including said fluid coupling and said fluid-controlled valve means, and means responsive to operation of said member controlling flow of fluid pressure in said circuit.

11. In combination, a reciprocating steam engine, a member for controlling the direction of rotation of said engine and having forward and reverse positions, a drive shaft operatively connected to said steam engine, a steam turbine, transmission gearing comprising a fluid-coupling operatively connecting said steam turbine to said drive shaft, a conduit for conducting steam to said steam turbine, a condenser, a conduit for by-passing said steam to said condenser, fluid-controlled valve means for directing the steam to either conduit, a fluid circuit including said fluid coupling and said fluid-controlled valve means, and means responsive to operation of said member, controlling flow of fluid pressure in said circuit.

12. In combination, a reciprocating engine, a member for controlling the direction of rotation of said engine and having forward and reverse positions, a drive shaft operatively connected to said steam engine, an exhaust steam turbine, transmission gearing comprising a fluid coupling operatively connecting said turbine to said drive shaft, a valve controlling the flow of exhaust steam to said turbine, and means responsive to operation of said member when moved to engine reversing position to cut off the steam supply to said turbine and to empty said fluid coupling.

13. In combination, a reciprocating steam engine, a drive shaft operatively connected to said engine, a steam turbine, means operatively connecting said turbine and said drive shaft, and including reduction gearing and a coupling permitting torsional oscillation of the shaft in respect to the turbine, a conduit for supplying steam to said turbine, a member for controlling the direction of rotation of said engine and having forward and reverse positions, valve means for controlling the flow of steam through said conduit to said turbine, and manually controlled means for operating said valve means to supply steam to the turbine when said control mechanism is in position for ahead operation of the reciprocating engine, and lost motion connections between said member and said valve means for shutting off steam to said turbine when said reciprocating engine is in reverse.

14. In combination, a reciprocating steam engine, control mechanism for said steam engine to effect stopping or forward or reverse operation, a drive shaft operatively connected to said engine, a steam turbine, means operatively connecting said turbine and said drive shaft, and including reduction gearing and a coupling permitting torsional oscillation of the shaft in respect to the turbine, a conduit for supplying exhaust steam from said reciprocating engine to said turbine, valve means for controlling the flow of steam through said conduit to said turbine, means responsive to the operation of said control mechanism for operating said valve means to shut off the supply of exhaust steam to the turbine when the reciprocating engine is reversed, said valve means having lost motion connections to said last mentioned means for permitting manual operation of said valve means to supply said exhaust steam to said turbine only when said reciprocating engine is in forward operation, and means independent of said valve means for supplying live steam to said turbine.

15. In combination, a reciprocating steam engine, control mechanism for said steam engine to effect stopping or forward or reverse operation, a drive shaft operatively connected to said engine, a steam turbine, means operatively connecting said turbine and said drive shaft, and including reduction gearing and a coupling permitting torsional oscillation of the shaft in respect to the turbine, a conduit for supplying exhaust steam from said reciprocating engine to said turbine, valve means for controlling the flow of steam through said conduit to said turbine, lost motion connections between said control mechanism and said valve means for preventing the flow of exhaust steam to said turbine upon operation of said control mechanism to reverse said reciprocating engine, and permitting the manual operating of said valve means to supply exhaust steam to said turbine when said control mechanism is in position for ahead operation of said reciprocating ongine.

16. In combination a reciprocating steam engine, control mechanism to effect stopping or forward or reverse operations, a drive shaft operatively connected to said engine, a steam turbine, means operatively connecting said turbine and said drive shaft and including reduction gearing and a coupling permitting torsional variations of said shaft in respect to the turbine, a conduit for supplying exhaust steam from said reciprocating engine to said turbine, valve means for controlling the flow of steam through said conduit to said turbine, fluid actuated means for operating said valve and including a valve member, and lost motion connections between said control mechanism and said valve member for effecting closing of said valve means upon operation of said control mechanism to reverse said reciprocating engine, said lost motion connections leaving said valve closed upon return movement of said control mechanism to forward position, but permitting manual operation of said valve member to effect opening of said valve means only when said control mechanism is in a position for forward operation of said reciprocating engine.

HANS WACH.